United States Patent
Kim et al.

(10) Patent No.: US 8,145,392 B2
(45) Date of Patent: Mar. 27, 2012

(54) SYSTEM AND METHOD FOR CONTROLLING AUTOMATIC LEVELING OF HEAVY EQUIPMENT

(75) Inventors: Jin Seop Kim, Changwon-si (KR); Chang Soo Lee, Changwon-si (KR); In Woo Kim, Changwon-si (KR)

(73) Assignee: Volvo Construction Equipment Holdings Sweden AB, Eskilstuna (SE)

( * ) Notice: Subject to any disclaimer, the term of this patent is extended or adjusted under 35 U.S.C. 154(b) by 731 days.

(21) Appl. No.: 12/239,167

(22) Filed: Sep. 26, 2008

(65) Prior Publication Data
US 2009/0085311 A1 Apr. 2, 2009

(30) Foreign Application Priority Data
Oct. 2, 2007 (KR) .................. 10-2007-0099266

(51) Int. Cl.
*B62D 33/06* (2006.01)
(52) U.S. Cl. ... 701/50; 280/6.15; 280/6.153; 280/6.154; 280/5.507; 280/DIG. 1; 37/907; 37/414; 37/195
(58) Field of Classification Search ............ 701/50, 701/1; 280/6.15, 6.153, 6.154, 6.159, 5.5, 280/5.507, DIG. 1; 180/89.14, 89.15; 37/907, 37/411–416, 382, 348, 195, 466
See application file for complete search history.

(56) References Cited

U.S. PATENT DOCUMENTS

| 5,988,654 A | 11/1999 | Wix et al. |
| 6,158,539 A | 12/2000 | Isley |

FOREIGN PATENT DOCUMENTS

| WO | 99/01329 A1 | 1/1999 |
| WO | 2007/139878 A2 | 12/2007 |
| WO | 2008/016310 A1 | 2/2008 |

*Primary Examiner* — Christopher J. Novosad
(74) *Attorney, Agent, or Firm* — Ladas & Parry LLP

(57) ABSTRACT

A system and method for controlling an automatic leveling of heavy equipment. The system, in which a lower frame having a traveling unit and an upper frame are combined together by a tilting unit, includes a sensor unit, provided in the equipment, for sensing twist angles of the lower frame and the upper frame against a reference horizontal surface and a traveling speed of the equipment. A control unit receives the twist angles and the traveling speed, sets a limit of an operation time for the automatic leveling in a standstill state of the equipment while calculating a corrected angle to which a twist angle of the upper frame is to be corrected, without setting the limit of the operation time for the automatic leveling, in a traveling state of the equipment, and generates a control signal for instructing an operation of a tilting unit in accordance with the corrected angle. A driving unit performs a tilting control through the tilting unit in accordance with the received control signal.

13 Claims, 14 Drawing Sheets

SYSTEM AND METHOD FOR CONTROLLING AUTOMATIC LEVELING OF HEAVY EQUIPMENT

CROSS-REFERENCE TO RELATED APPLICATION

This application is based on and claims priority from Korean Patent Application No. 10-2007-0099266, filed on Oct. 2, 2007 in the Korean Intellectual Property Office, the disclosure of which is incorporated herein in its entirety by reference.

BACKGROUND OF THE INVENTION

1. Field of the Invention

The present invention relates generally to a leveling system and method for heavy equipment, and more particularly to a system and method for controlling an automatic leveling of heavy equipment, which can perform an automatic leveling control in accordance with a traveling state and a standstill state of the heavy equipment.

2. Description of the Prior Art

In heavy equipment, such as an excavator, a logging device, a crane, and the like, which is working on an inclined site, an upper frame is inclined to a horizontal surface depending on the ruggedness of ground.

When the heavy equipment is in an inclined state, inclination of an upper frame to a horizontal surface is changed as the upper frame is swiveled, and this causes the work to be done in an unstable state of the equipment. Also, as the center of gravity of the equipment is moved, a danger of overturning of the heavy equipment is increased.

In order to solve this problem, a method of moving the center of gravity of the heavy equipment near to ground through tilting of an upper frame on an inclined site has been used.

As a recent technology related to the above-described method, U.S. Pat. No. 6,609,581 discloses a tilt mechanism having an upper support being supported and tilted by two hydraulic cylinders.

Also, U.S. Pat. No. 6,158,539 discloses two hydraulic cylinders, upper bearing body support plate connected to a center tilt shaft, and a lower plate.

As such tilting means is complicated, it is required that a user has a good experience in manually controlling the tilting through an expansion/contraction adjustment device of hydraulic cylinders with recognition of mutual relations among respective hydraulic cylinders, and thus it is not easy for a user to properly perform the tilting control.

Also, in the case where an operator manually controls the tilting of the heavy equipment as the equipment is moving in a rugged area, the operator should manipulate the leveling simultaneously with driving of the equipment. Accordingly, the operator cannot concentrate his attention on the driving of the equipment only, and thus the safety is lowered.

SUMMARY OF THE INVENTION

Accordingly, the present invention has been made to solve the above-mentioned problems occurring in the prior art while advantages achieved by the prior art are maintained intact.

One object of the present invention is to provide a system and method for controlling an automatic leveling of heavy equipment, which can automatically control leveling of an upper frame of the heavy equipment so as to prevent the upper frame from being unstably tilted or from overturning.

Another object of the present invention is to provide a system and method for controlling an automatic leveling of heavy equipment, which can improve the safety of the heavy equipment by reducing the movement of the center of gravity even during traveling of the heavy equipment.

Still another object of the present invention is to provide a system and method for controlling an automatic leveling of heavy equipment, which can immediately stop tilting control through an operator's participation if an emergency occurs during an automatic tilting control process.

Still another object of the present invention is to provide a system and method for controlling an automatic leveling of heavy equipment, which can adjust a control speed in accordance with the tilt of an upper frame.

In order to accomplish these objects, there is provided a system for controlling automatic leveling of heavy equipment with a lower frame, an upper frame and a tilting means, the lower frame having traveling means, the upper frame tiltably and swingably connected to the lower frame, and the tilting means for tiltably connecting the upper frame to the lower frame, the system comprising:

a sensor unit, provided in the equipment, for sensing twist angles of the lower frame and the upper frame against a reference horizontal surface and a traveling speed of the equipment;

a control unit for receiving the twist angles and the traveling speed, setting a limit of an operation time for an automatic leveling in a standstill state of the equipment while calculating a corrected angle to which a twist angle of the upper frame is to be corrected, without setting the limit of the operation time for the automatic leveling, in a traveling state of the equipment, and generating a control signal for instructing an operation of the tilting means in accordance with the corrected angle; and a driving unit for performing a tilting control through the tilting means in accordance with the received control signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
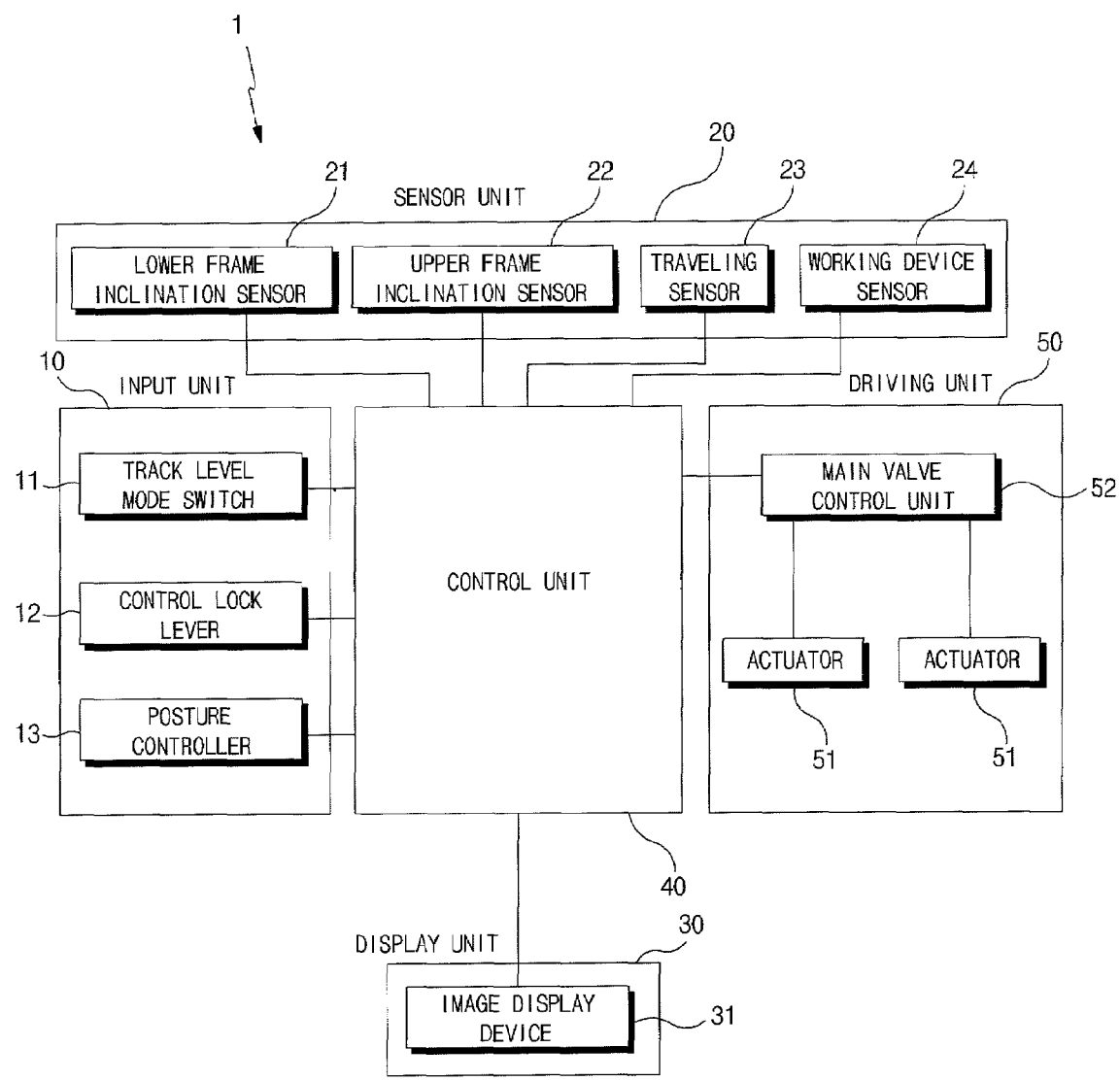
FIG. 1 is a block diagram of a system for controlling an automatic leveling of heavy equipment according to an embodiment of the present invention.
Figure 2:
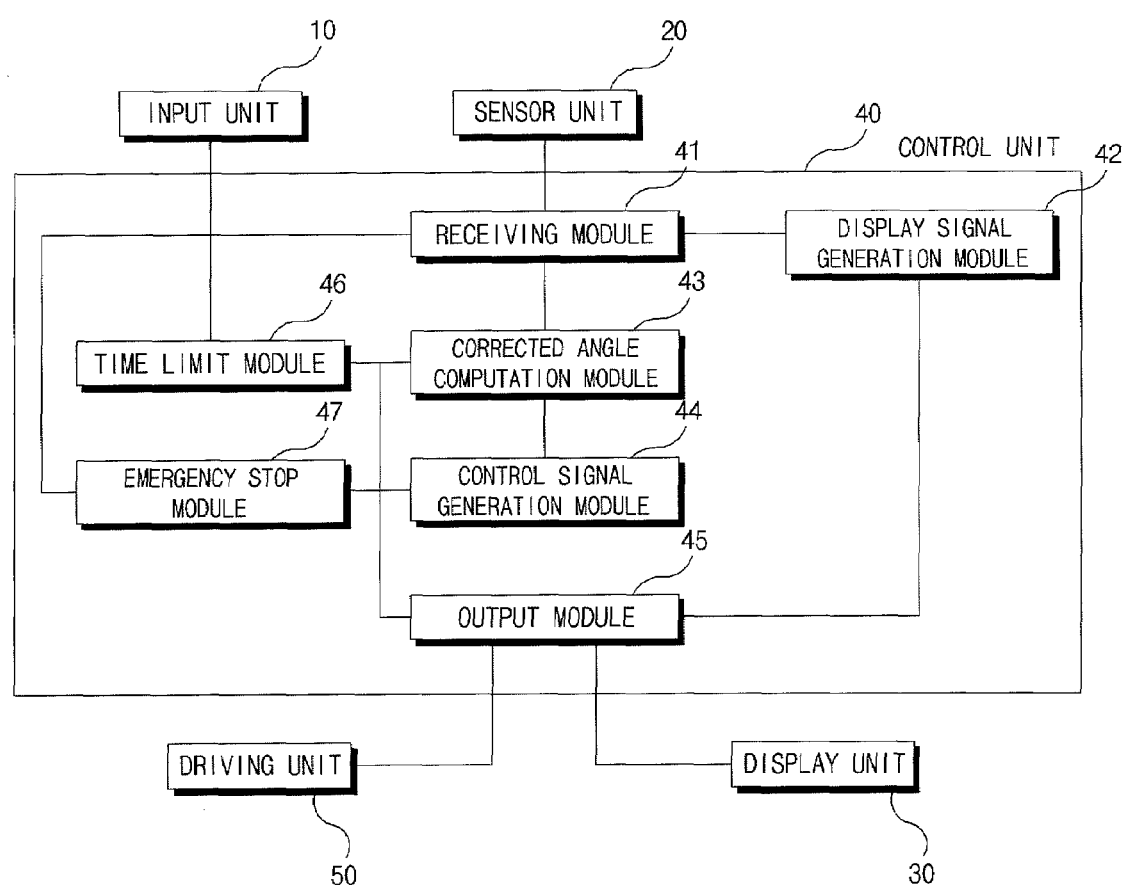
FIG. 2 is a block diagram illustrating the construction of a control unit adopted in a system for controlling an automatic leveling of heavy equipment as illustrated in FIG. 1.

Hereinafter, a system and method for controlling an automatic leveling for heavy equipment according to preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

In the drawings, the reference numeral "101" denotes a lower frame of a lower driving structure provided with a traveling means, "104" denotes an upper frame, "210" denotes a reference horizontal surface, "220" denotes an expanded plane surface of the upper frame, "230" denotes an expanded plane surface of the lower frame, and "240" denotes a virtual plane surface according to a reference angle.

In the following description of the present invention, the same drawing reference numerals are used for the same elements across various figures.

The term "twist angle" used in the description includes a pitching angle in forward/backward direction and a rolling angle in a left/right direction. Unless the rolling angle and the pitching angle are used in distinction from each other, the twist angle means the pitching angle and the rolling angle.

Also, the term "reference horizontal surface" means a horizontal surface in a direction of gravity.

A system 1 for controlling an automatic leveling for heavy equipment according to an embodiment of the present invention includes an input unit 10, a sensor unit 20, a display unit 30, a control unit 40, and a driving unit 50.

The input unit 10 includes an auto mode switch 11, a control lock lever 12, and a posture controller 13 in the form of a stick.

The auto mode switch 11 serves to perform a tilting control to be described later in an on state (i.e. active state), and if the auto mode switch 11 is in an off state (i.e. inactive state) during the tilting control process, it serves as an input means of an emergency stop condition to immediately terminate the leveling control.

On the other hand, the control lock lever 12 serving as a separate input means of the emergency stop condition, if it is in an on state (i.e. active state), judges that the emergency stop condition is satisfied and immediately stop the leveling control, while if it is in an off state (i.e. inactive state), it performs a normal leveling control.

Also, the control lock lever 12 may be used as a general safety device that does not perform an automatic leveling control in consideration of its activation/inactivation state as the conditions precedent of control to be described later.

On the other hand, the posture controller 13 is an input device for performing the tilting of the upper frame in accordance with a user's manipulation.

In the sensor unit 20, inclination sensors 21 and 22, a traveling sensor 23, and a working device sensor 24 may be provided. The inclination sensors 21 and 22 are mounted on the lower frame 101 and the upper frame 104, respectively. The inclination sensor 21 on the lower frame measures a twist angle of the lower frame on the basis of a reference horizontal surface 210, and the inclination sensor 22 on the upper frame measures a twist angle (i.e. a pitching angle and a rolling angle) of the upper frame on the basis of the reference horizontal surface.

The traveling sensor 23 measures a traveling speed of the heavy equipment through a traveling means of the lower frame.

The twist angles of the upper frame 104 and the lower frame 101, and the traveling speed, which are measured by the sensor unit 20, are transferred to the control unit 40 as control variables for tilting control.

The working device sensor 24 detects whether the working device, which is coupled to a boom of the upper frame, such as a logging header, a bucket, and the like, is in an operation state, and outputs corresponding working state information.

The display unit 30 presents the respective twist angles to a user through a video display device 31. Through the display unit 30, a user can observe a tilting control process, and, if needed, can terminate the corresponding tilting control by satisfying an emergency stop condition through manipulation of the input unit 10. That is, the display unit 30 presents the current posture of the heavy equipment to the user in real time, so that the user can monitor whether the leveling control system malfunctions, or take part in the automatic leveling control.

On the other hand, the driving unit 50 may include a tilting means 51 including actuators that use at least one hydraulic pressure for tilting the upper frame 104, and a main valve controller 52 for providing a hydraulic control signal to the respective actuators for operating the tilting means 51. The actuators of the driving unit 50 may be of a hydraulic pressure type or an air pressure type, and instead of the actuator, an electric motor may be used as a tilting means.

The control unit 40 generates a necessary control signal by computing an operation period of the tilting means 51 for the automatic leveling control, e.g. the hydraulic actuators from the twist angles and the traveling speed measured by the sensor unit 20, and transmits the generated control signal to the driving unit.

The control unit 40 may include a receiving module 41, a display signal generation module 42, a corrected angle computation module 43, a control signal generation module 44, and an output module 45.

The receiving module 41 receives the twist angles, the traveling speed, and the working state information measured by the sensor unit 20, and transmits the received signals to the display signal generation module 42, the corrected angle computation module 43, and the control signal generation module 44.

Then, the receiving module 41 receives a signal from the sensor unit sensing the twist angles of the lower frame and the upper frame against a reference horizontal surface, and the traveling speed of the lower frame.

The display signal generation module 42 generates a display signal for displaying the twist angles of the respective reference horizontal surfaces of the lower frame and the upper frame through the display unit 30.

On the other hand, the corrected angle computation module 43 determines the twist angle of the upper frame as a first twist angle 201, and computes a corrected angle 204 that is an angle displacement to be applied from the first twist angle 201 to the upper frame for the tilting control.

Then, the corrected angle calculation module is setting the twist angle of the upper frame in comparison to a first twist angle, and calculating the corrected angle from the first twist angle.

As described above, the first twist angle 201 includes a pitching angle and a rolling angle against the reference horizontal surface of the upper frame 104, and the principal target of the leveling control is to make the pitching angle and the rolling angle parallel to the reference angle inputted by the user.

That is, the reference angle 203 is an angle to which the upper frame 104 is to be tilt-controlled and converged. For example, if the target is the horizontal leveling against the reference horizontal surface, the pitching angle and the rolling angle of the reference angle are set to 0°, respectively. In this case, the target of the leveling control is to make the expanded plane surface 220 of the upper frame 104 parallel to the reference horizontal surface 210.

On the other hand, it is possible for a user to set the reference angle 203 including the pitching angle and the rolling angle to a specified angle in advance, and this may be performed by a separate input device before the tilting control is performed according to the present invention. In this case, the target of leveling is to make the expanded plane surface equal to a reference surface 240 that is obtained by adding the reference angle 203 to the reference horizontal surface 210.

In this case, the user can improve the working efficiency by setting a working angle optimized to the user himself as the reference angle. However, even in this case, it is required to set the reference angle in consideration of the movement range of the center of gravity of the heavy equipment.

On the other hand, it may be determined that the target of tilting control is satisfied, i.e., that the first twist angle 201 is converged to the reference angle 203, when the first twist angle 201 stays within a minute convergence region that is set in the neighborhood of the reference angle.

Hereinafter, the corrected angle will be described.

The corrected angle 204 is the twist angle of the upper frame 104 to be corrected through the leveling control, and is calculated using the first twist angle 201 and the reference angle 203 or the maximum allowable twist angle range 206 as parameters.

In relation to the calculation of the corrected angle, a second twist angle 205 and the maximum allowable twist angle range, which are related to the limit of the tilting control range according to the characteristic of the driving unit, will be first described.

Figure 3:
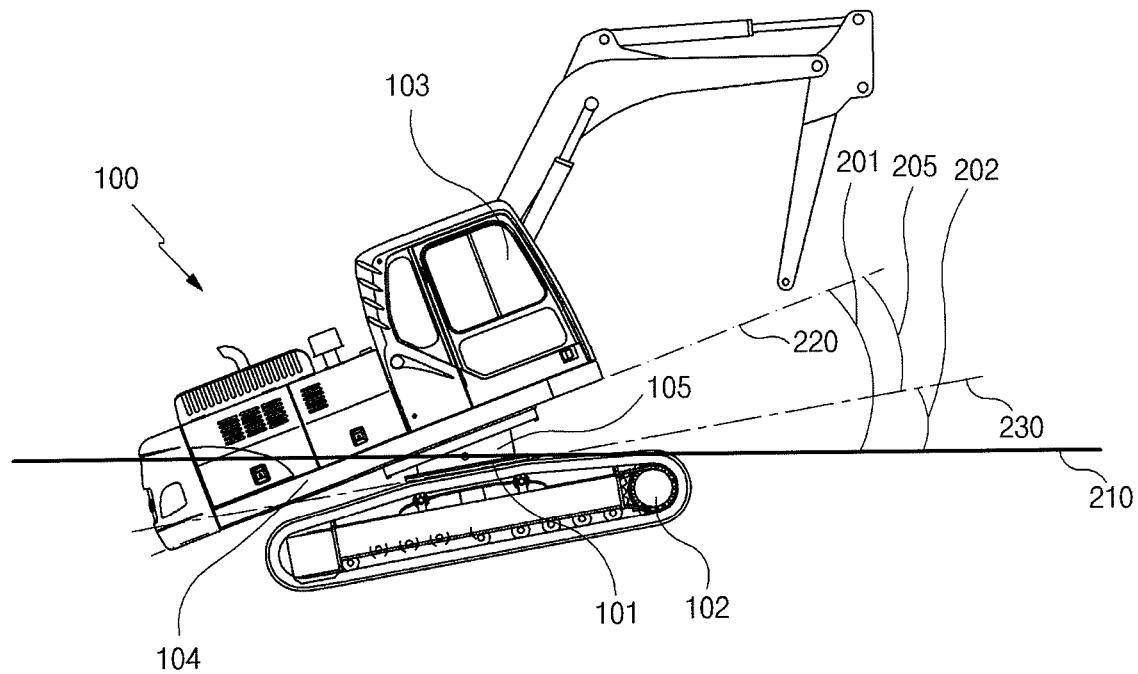
FIG. 3 is a side view of heavy equipment adopting a system for controlling an automatic leveling for heavy equipment according to an embodiment of the present invention.

Referring to FIG. 3, the second twist angle is a twist angle of the upper frame 104 that is based on the lower frame 101 being determined by the first twist angle and the twist angle 202 of the lower frame, and is determined by the following condition 1.

(Condition 1)

Second Twist Angle=First Twist Angle−Twist Angle of Lower Frame

On the other hand, the maximum allowable twist angle range 206 is an inherent marginal displacement angle that is caused by the structural margin of the tilting means 105, and means an angle range in which the second twist angle can be displaced. In accordance with the construction of the driving unit, the maximum and minimum pitching angles and the maximum and minimum rolling angles on the plane surface of the lower frame 101 may differ, and the maximum allowable twist angle range means the variable margin of such pitching angle range and the rolling angle range.

Hereinafter, it is defined that the maximum allowable upper limit twist angle range 206a includes the maximum pitching angle and the maximum rolling angle on the lower frame 101 that is a reference plane surface, and the maximum allowable lower limit twist angle range 206b includes the minimum pitching angle and the minimum rolling angle on the lower frame 101 that is a reference plane surface. The maximum allowable upper limit twist angle range 206a and the maximum allowable lower limit twist angle range 206b form the maximum allowable twist angle range 206, which is the physical marginal range of the tilting control.

The maximum allowable twist angle range 206 is calculated based on the twist angle range reference angle twist angle of lower frame 202 so that it is determined with the range of "the twist angle range reference angle twist angle of lower frame+maximum allowable upper limit of the twist angle range"and "the twist angle of lower frame−maximum allowable lower limit of the twist angle range"

For example, if it is assumed that the upper limit pitching angle range is 15°, the lower limit pitching angle range is 10°, and the current pitching angle of the lower frame is x°, a controllable pitching angle range of a certain tilting means can be obtained as an angle value in the range of (x−10)° to (x+15)°. This means that the pitching angle of the upper frame 104 can be controlled only within the range of (x−10)° to (x+15)°.

The heavy equipment is bilaterally symmetric, and thus it is general that the maximum allowable upper limit rolling angle range is equal to the maximum allowable lower limit rolling angle range. However, front and rear parts of the heavy equipment are not symmetric, and thus it is general that the maximum allowable upper limit rolling angle range is not equal to the maximum allowable lower limit rolling angle range to limit the controllable range.

The basis of the corrected angle 204 differs depending on whether the reference angle 203 is included in the maximum allowable twist angle range 206 calculated as a detailed angle value.

If the reference angle 203 is within the maximum allowable twist angle range 206, it is possible to tilt the upper frame 104 so that the first twist angle becomes equal to the reference angle 203, and thus the corrected angle 204 is determined based on the reference angle 203.

Figure 7:
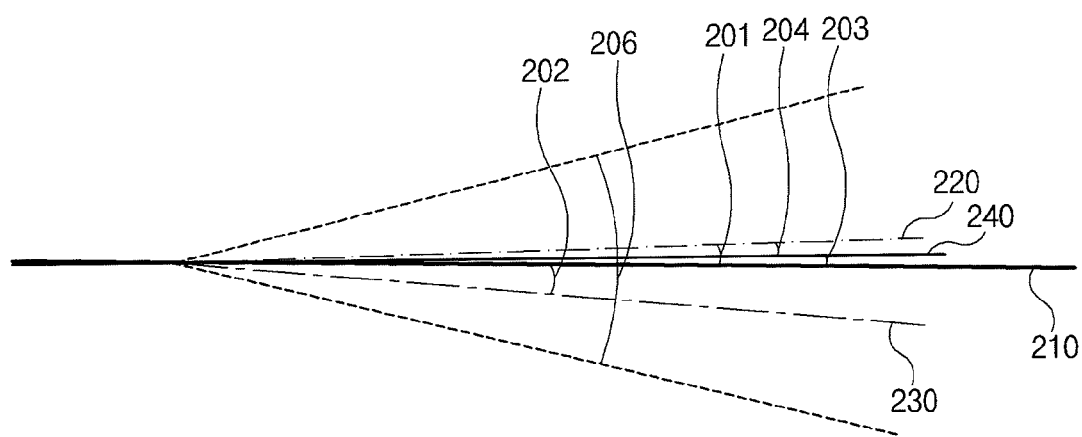
FIG. 7 is a view illustrating corrected angles of a system for controlling an automatic leveling of heavy equipment according to an embodiment of the present invention.

That is, as illustrated in FIG. 7, if the condition is set to "Twist angle of lower frame−Maximum allowable lower limit twist angle value≦Reference angle≦Twist angle of lower frame +Maximum allowable upper limit twist angle range", the upper frame can be tilted to match the reference angle 203, and the corrected angle at this time is determined by the following condition 2.

(Condition 2)

Corrected Angle=Reference Angle−First Twist Angle

For example, it is considered that the pitching angle of the lower frame 101 is −10°, the pitching angle of the upper frame 104 is +3°, the maximum allowable pitching angle range is 30° (i.e. the upper limit pitching angle range is +15°, and the lower limit pitching angle range is −15°), and the reference angle is 0° (i.e. the target is the horizontal level against the reference horizontal surface).

In this case, since the reference angle satisfies the condition of "−25° (Twist angle of lower frame−Maximum allowable lower limit twist angle range)≦0° (Reference angle) ≦5° (Twist angle of lower frame+Maximum allowable upper limit twist angle range)", the inverted value of the first twist angle, e.g., −3°, becomes the corrected angle under condition 2.

As another example as shown in FIG. 7, it is considered that the pitching angle of the lower frame 101 is −10°, the pitching angle of the upper frame 104 is +8°, the maximum allowable pitching angle range is 30° (i.e. the upper limit pitching angle range is +20°, and the lower limit pitching angle range is −10°), and the reference angle 203 is +2°.

In this case, since the reference angle 203 satisfies the condition of "−20° (Twist angle of lower frame−Maximum allowable lower limit twist angle range)≦+2° (Reference angle) ≦10° (Twist angle of lower frame+Maximum allowable upper limit twist angle range)", −6° becomes the corrected angle 204 under condition 2.

On the other hand, in the case where the reference angle 203 is out of the maximum allowable twist angle range 206, the corrected angle 204 is determined based on the maximum allowable upper limit twist angle range or the maximum allowable lower limit twist angle range. That is, since the upper frame cannot be tilted over the maximum allowable twist angle range, it is leveled near the reference angle 203 at maximum. As a result, the corresponding leveling control is performed so that the first twist angle, instead of the reference angle, is leveled in the maximum allowable upper limit twist angle range or the maximum allowable lower limit twist angle range.

In this case, whether to level the first twist angle on the basis of the maximum allowable upper limit twist angle range 206a or the maximum allowable lower limit twist angle range 206b is determined depending on whether the reference angle 203 corresponds to "Reference angle<twist angle of lower frame−maximum allowable lower limit twist angle range"or "Twist angle of lower frame+maximum allowable lower limit twist angle range<Reference angle".

First, in the case of "Reference angle<twist angle of lower frame−maximum allowable lower limit twist angle range", the tilting control is performed in a manner that the corrected angle is determined based on the maximum allowable lower limit twist angle range, under the following condition 3, so that the upper frame 104 is tilted toward the maximum allowable lower limit twist angle range to approach the reference angle.

(Condition 3)

Figure 8:
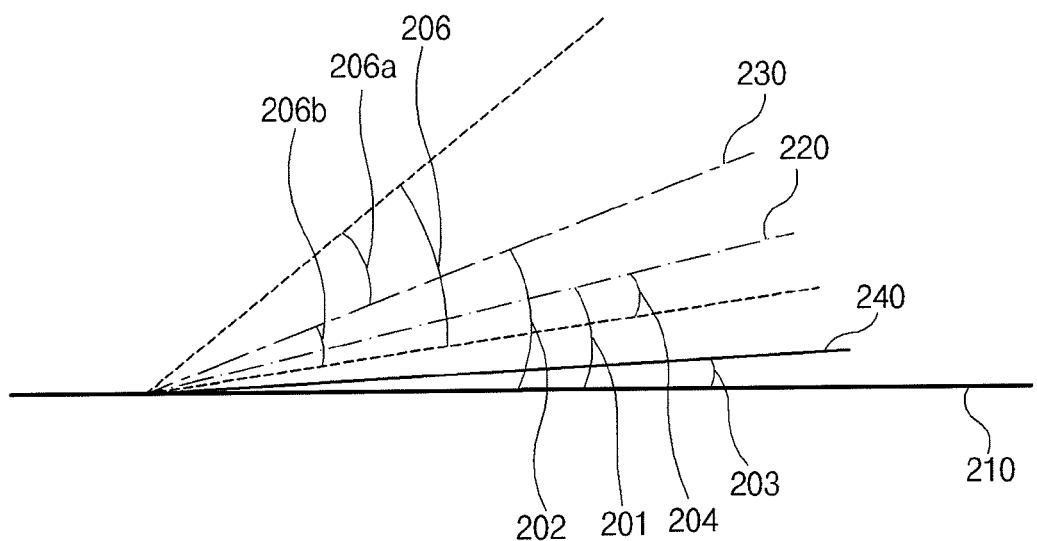
FIG. 8 is a view illustrating corrected angles of a system for controlling an automatic leveling of heavy equipment according to another embodiment of the present invention.

Corrected Angle=Twist Angle of Lower Frame−Maximum Allowable Lower Limit Twist Angle Range−First Twist Angle For example, the case where the reference angle 203 is "Reference angle<twist angle of lower frame−maximum allowable lower limit twist angle range", on condition that the pitching angle of the lower frame 101 is +25°, the pitching angle of the upper frame 104 is +15°, the maximum allowable pitching angle range is 30° (i.e. the upper limit pitching angle range is +15°, and the lower limit pitching angle range is −15°), and the reference angle 203 is 0° (i.e. the target is the horizontal level against the reference horizontal surface), will be described with reference to FIG. 8.

In this case, since the reference angle (e.g. 0°) is smaller than "Twist angle of lower frame−maximum allowable lower limit twist angle range" (e.g. +10°), the upper frame cannot be tilted so that the first twist angle 201 becomes the reference angle 203. However, the upper frame 104 can be tilted until the first twist angle 201 reaches the maximum allowable lower limit twist angle range 206b, and thus the corrected angle 204 is based on "Twist angle of lower frame−maximum allowable lower limit twist angle range". As a result, the corrected angle 204 becomes −5° under the condition 2.

As a result of performing the leveling control with the corrected angle of −5°, the pitching angle 201 of the upper frame 104 becomes +10°, and at this time, the pitching angle (i.e. the second twist angle) of the upper frame 104 against the lower frame 101 becomes −15°, which corresponds to the maximum allowable lower limit pitching angle range 206b, so that the target of tilting is satisfied.

On the other hand, in the case of "Twist angle of lower frame+maximum allowable upper limit twist angle range<reference angle", the tilting control is performed in a manner that the corrected angle is determined under the following condition 4, so that the upper frame is tilted toward the maximum allowable upper limit twist angle range 206a to approach the reference angle 203.

(Condition 4)

Figure 9:
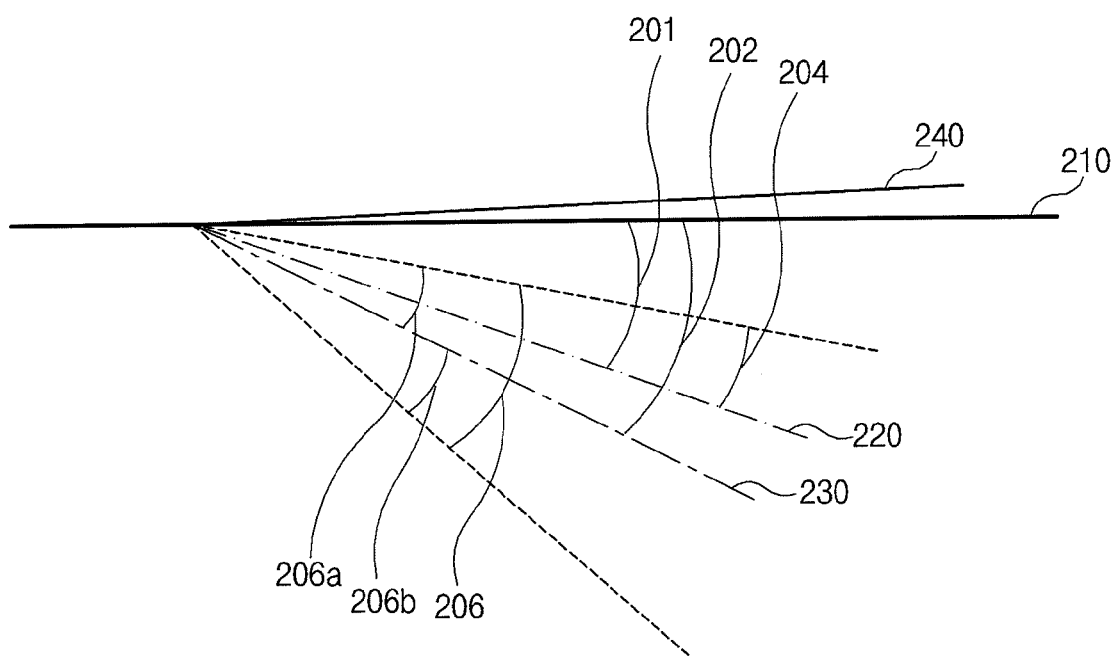
FIG. 9 is a view illustrating corrected angles of a system for controlling an automatic leveling of heavy equipment according to still another embodiment of the present invention.

Corrected Angle=Twist Angle of Lower Frame−Maximum Allowable Upper Limit Twist Angle Range−First Twist Angle For example, the case where the reference angle 203 is "Twist angle of lower frame+maximum allowable upper limit twist angle range <reference angle", on condition that the pitching angle of the lower frame 101 is −25°, the pitching angle of the upper frame 104 is −15°, the maximum allowable pitching angle range is 30° (i.e. the upper limit pitching angle range is +15°, and the lower limit pitching angle range is −15°), and the reference angle is +1°, will be described with reference to FIG. 9.

In this case, the reference angle (e.g. +1°) is larger than "Twist angle of lower frame+maximum allowable upper limit twist angle range" (e.g. −10°), and the corrected angle 204 is based on "Twist angle of lower frame−maximum allowable lower limit twist angle range". As a result, the corrected angle 204 becomes +5° under the condition 4.

As a result of performing the leveling control with the corrected angle of +5°, the pitching angle 201 of the upper frame 104 becomes −10°, and at this time, the pitching angle (i.e. the second twist angle) of the upper frame 104 against the lower frame 101 becomes +15°, which corresponds to the maximum allowable upper limit pitching angle range, so that the target of tilting is satisfied.

In summary, if the upper frame 104 can be tilted to match the reference angle 203, the corrected angle 204 is calculated based on the reference angle 203, while if the angle that can be tilted by the limit of the maximum allowable twist angle range 206 is restricted, the corrected angle 204 is alternatively calculated based on the limit of the maximum allowable twist angle range.

In addition, since the twist angle of the lower frame 101 is divided into the pitching angle and the rolling angle, the pitching angle and the rolling angle, which are included in the corrected angle, are independently calculated by selectively using the conditions 2 to 4, and the resultant pitching angle and rolling angle correspond to the corrected angle.

On the other hand, the control signal generation module 44 determines a region where the actuator 51 of the driving unit is to be operated according to the corrected angle obtained by the above-described method, and generates the control signal according to this operation region.

At this time, if a plurality of actuators 105d, 105e, 105f, and 105g is provided in the driving unit, the compensation relations among the actuators should be considered in accordance with the pitching angle and the rolling angle of the corrected angle.

Figure 4:
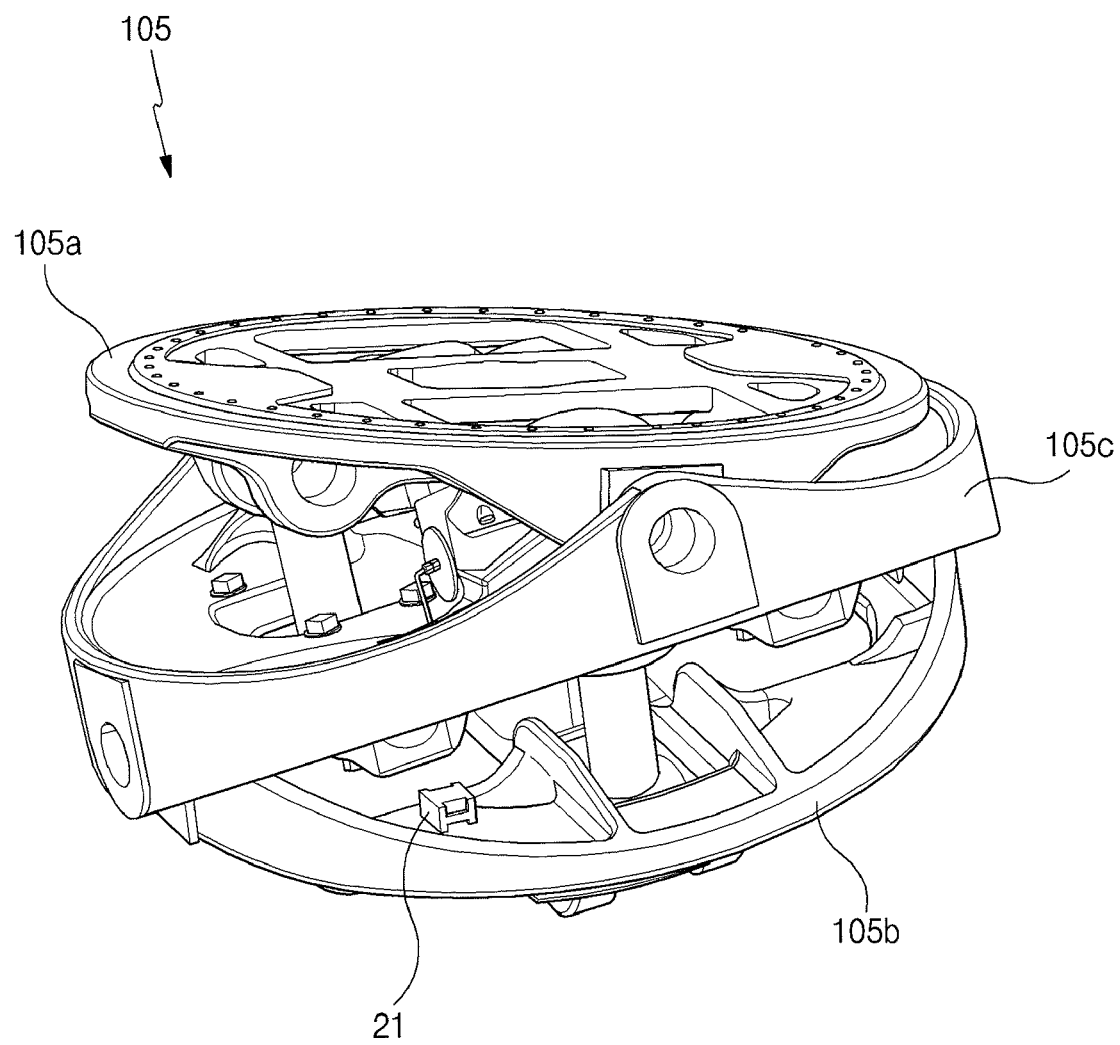
FIG. 4 is a perspective view of a tilting means of heavy equipment as illustrated in FIG. 3.
Figure 5:
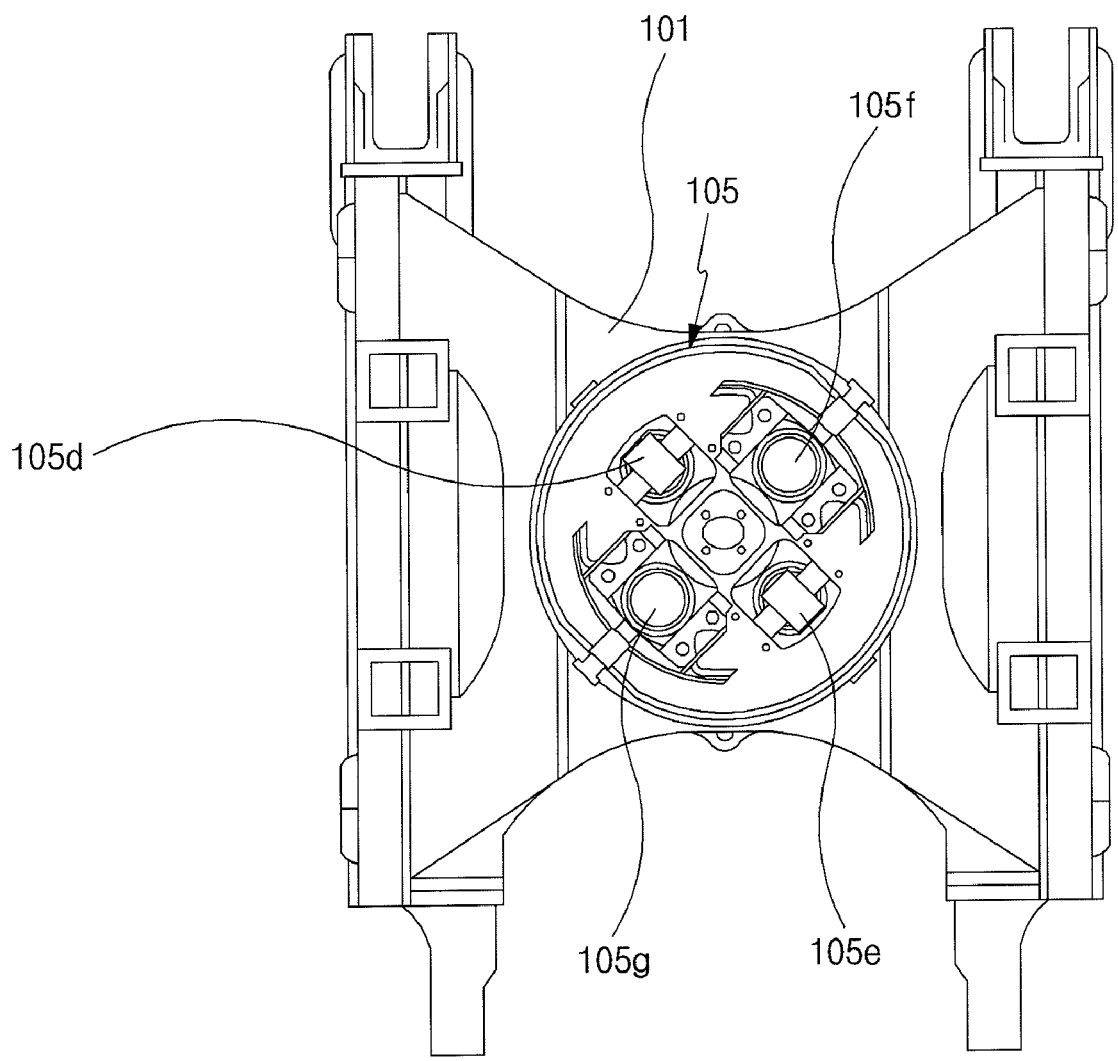
FIG. 5 is a schematic sectional view of and a lower frame and a tilting means of heavy equipment as illustrated in FIG. 3.
Figure 6:
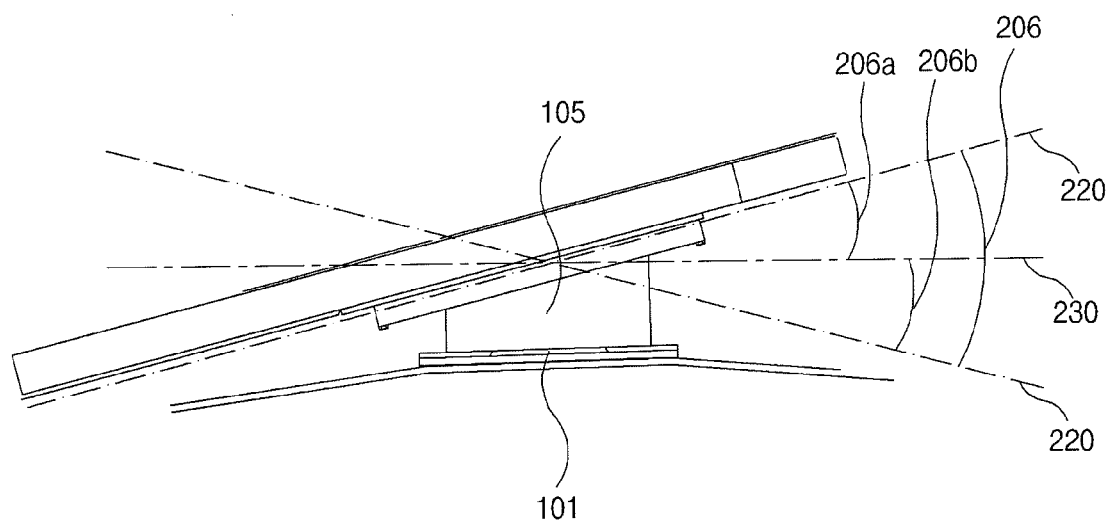
FIG. 6 is a view illustrating the maximum allowable twist angle range according to a tilting means of heavy equipment as illustrated in FIG. 3.

For example, as illustrated in FIG. 4, the tilting means 105 is provided with a swing bearing mount frame 105a to which the upper frame 104 is rotatably coupled, a support frame 105b fixed to the lower frame 101, and a tilt frame 105c for connecting the swing bearing mount frame to the support frame. The swing bearing mount frame and the support frame have a construction in which for actuators 105d, 105e, 105f, and 105g are provided. In this case, as illustrated in FIG. 5, the four actuators are installed in slanting lines.

In order to increase the front pitching angle in the tilting means 105 provided with the four actuators 105d, 105e, 105f, and 105g, it is required that two front actuators 105d and 105f are expanded, and in proportion to this expansion, two rear actuators 105e and 105g are contracted. In order to increase the right rolling angle, it is required that two right actuators 105e and 105f are expanded and in proportion to this expansion, two left actuators 105d and 105g are contracted.

In order to increase/decrease the first twist angle according to the corrected angle determined by a certain pitching angle and rolling angle in the above-described method, the operation region is determined from the mutual displacement relations among the actuators 105d, 105e, 105f, and 105g predetermined according to the tilting means.

On the other hand, the currently expanded length of the respective actuators 51 of the driving unit 50 that can be analogized from the second twist angle may be determined as an initial value of the control signal, and the control signal corresponding to the intermittent time of a hydraulic valve that operates the corresponding actuator is generated in accordance with the operation region determined by the corrected angle as described above.

In the present invention, the control signal may be classified into a first control signal for operating the actuator at normal speed and a second control signal for operating the actuator at low speed, in accordance with the degree of convergence of the twist angle to the target of control. That is, the first and second control signals are selectively generated depending on whether or not the first twist angle approaches the limit of the maximum allowable twist angle range or the reference angle 203, and thus the operation speed of the actuator is controlled.

More specifically, if the first twist angle is changed in the neighborhood of the upper limit or lower limit of the maximum allowable twist angle range, it means that the actuators 105d, 105e, 105f, and 105g are operated in the neighborhood of the maximum expansion point or the maximum contraction point. In this case, if pistons of the actuators 105d, 105e, 105f, and 105g are operated at high speed, collision or impact may occur at the maximum expansion point or the maximum contraction point due to the piston inertia of corresponding actuator. In order to mitigate such collision or impact and to prevent the damage of the cylinder at the end of the corresponding actuator, the second control signal for operating the actuator at low speed is generated.

Also, if the actuators 105d, 105e, 105f, and 105g are operated in the neighborhood of the reference angle, the second control signal for operating the actuator at low speed is generated when the first twist angle is converged to the target of control and thus the corrected angle becomes 0°, in order to protect the user from the impact caused by an abrupt stop of the actuators 105d, 105b, 105c, and 105.

Hereinafter, detailed conditions for generating the second control signal are as follows.

Figure 10:
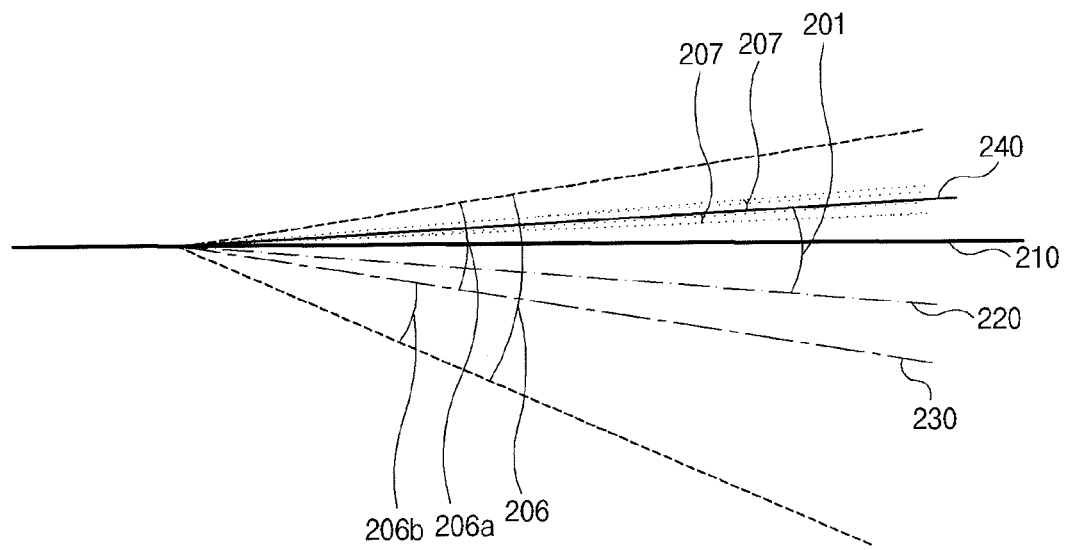
FIG. 10 is a view illustrating a reference convergence range of a system for controlling an automatic leveling of heavy equipment according to still another embodiment of the present invention.

First, it is considered that the reference angle is positioned within the maximum allowable twist angle range, i.e. the first twist angle is displaced in the neighborhood of the reference angle 203 as illustrated in FIG. 10. That is, if the first twist angle converges within a specified range of the reference angle 203, the control signal is changed from the first control signal to the second control signal. For this, the specified range of the reference angle 203 (hereinafter referred to as "reference convergence range") is determined according to the following condition 5.

(Condition 5)

Reference Angle−Constant Angle≦Reference Convergence Range≦Reference Angle+Constant Angle Here, the constant angle 207 is an angle in a speed reduction region determined by user's optional setting. That is, if the first twist angle converges into the range of "Reference Angle±Constant Angle", the second control signal for operating the actuator at low speed is generated.

Figure 11:
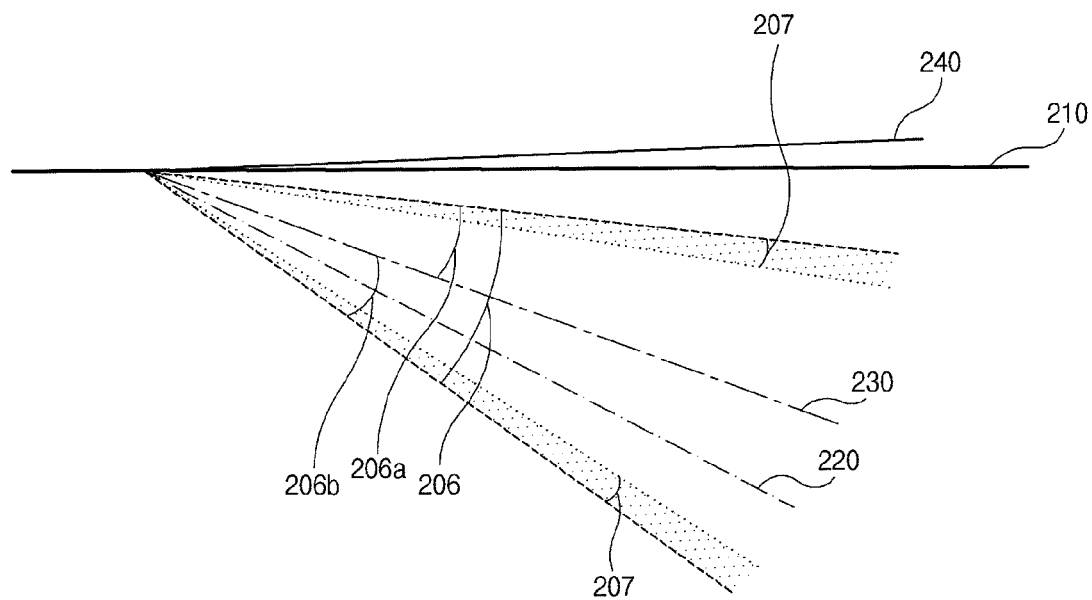
FIG. 11 is a view illustrating a marginal convergence range of a system for controlling an automatic leveling of heavy equipment according to still another embodiment of the present invention.
Figure 12:
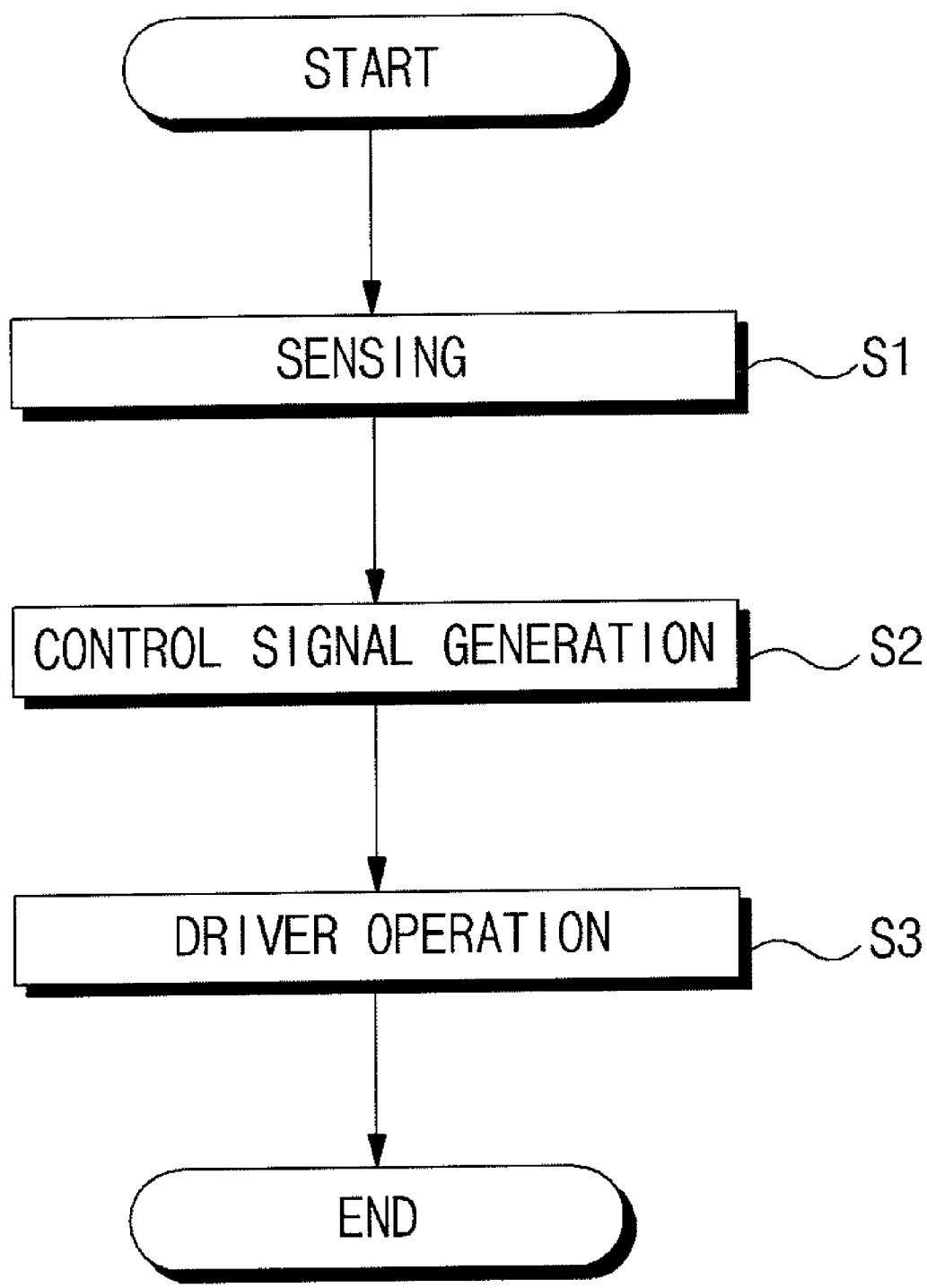
FIG. 12 is a flowchart briefly illustrating a method for controlling an automatic leveling of heavy equipment according to an embodiment of the present invention.
Figure 13:
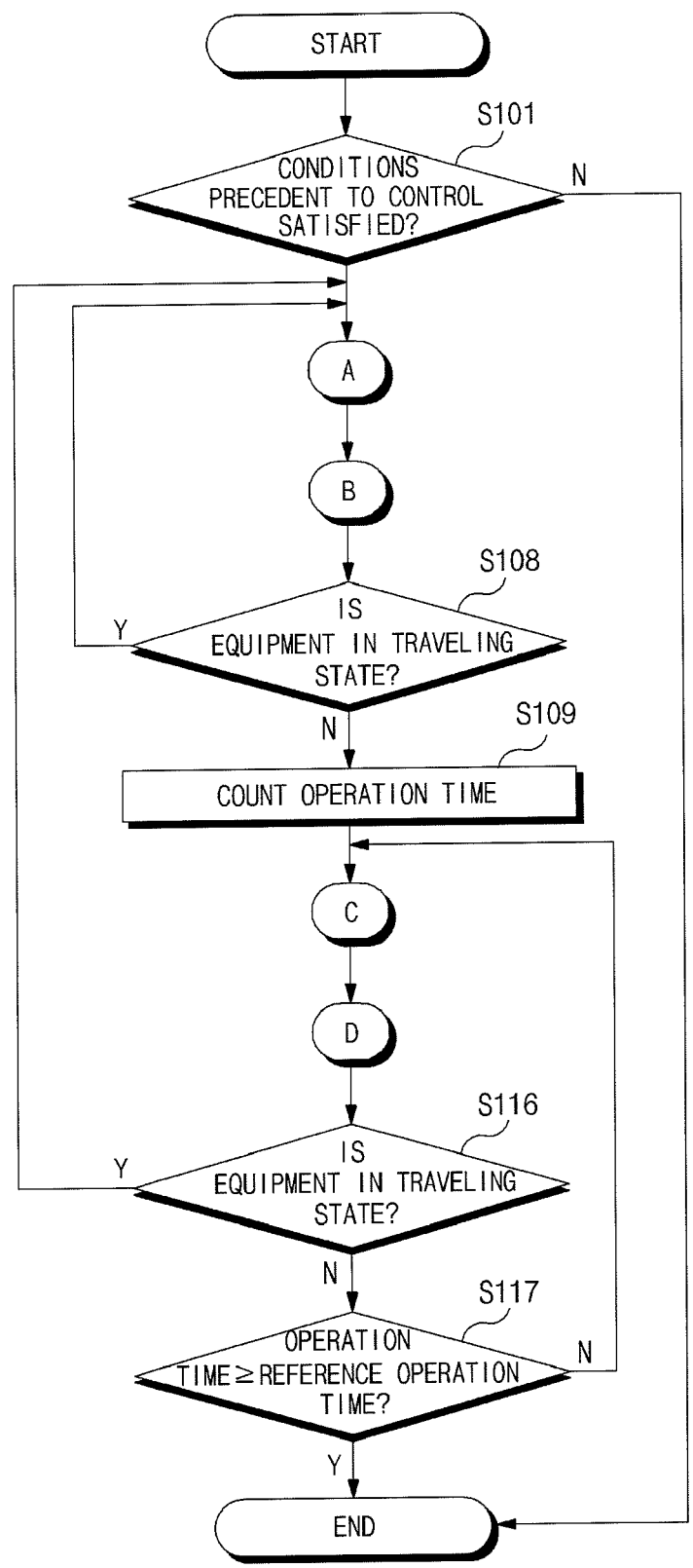
FIG. 13 is a flowchart illustrating a step of generating a control signal adopted in a method for controlling an automatic leveling of heavy equipment as illustrated in FIG. 12.
Figure 14:
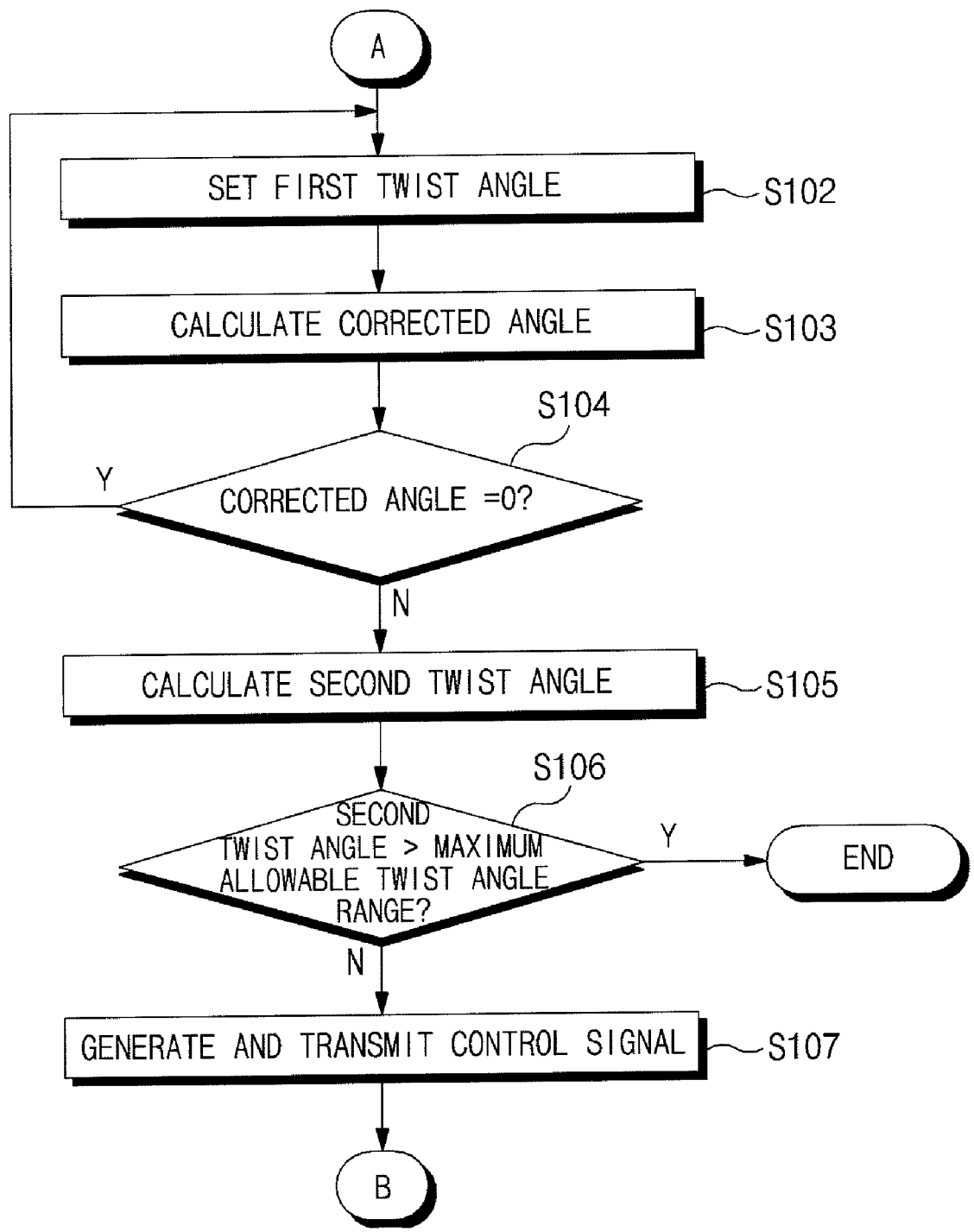
FIG. 14 is a flowchart illustrating steps A-B as illustrated in FIG. 13.
Figure 15:
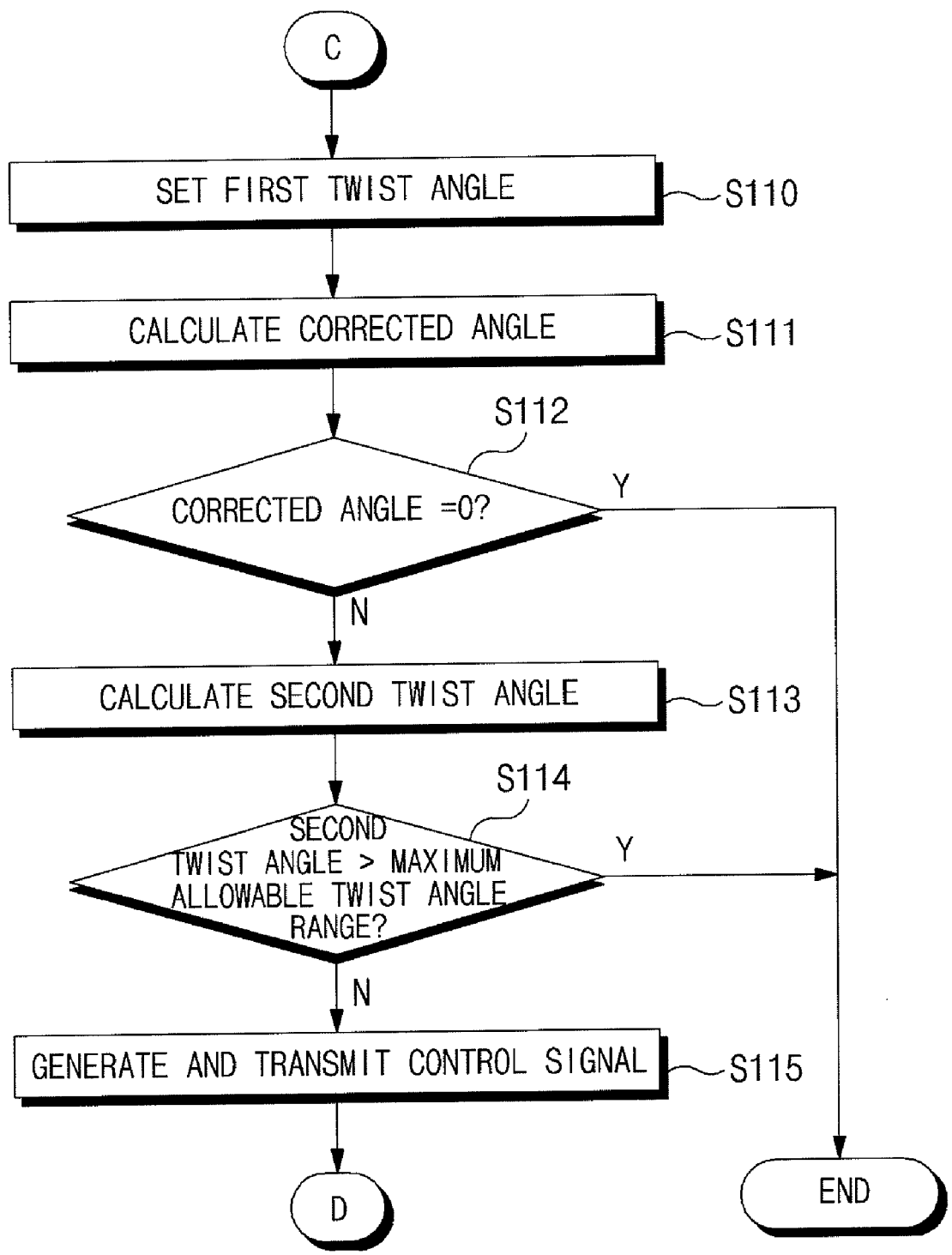
FIG. 15 is a flowchart illustrating steps C-D as illustrated in FIG. 13.
Figure 16:
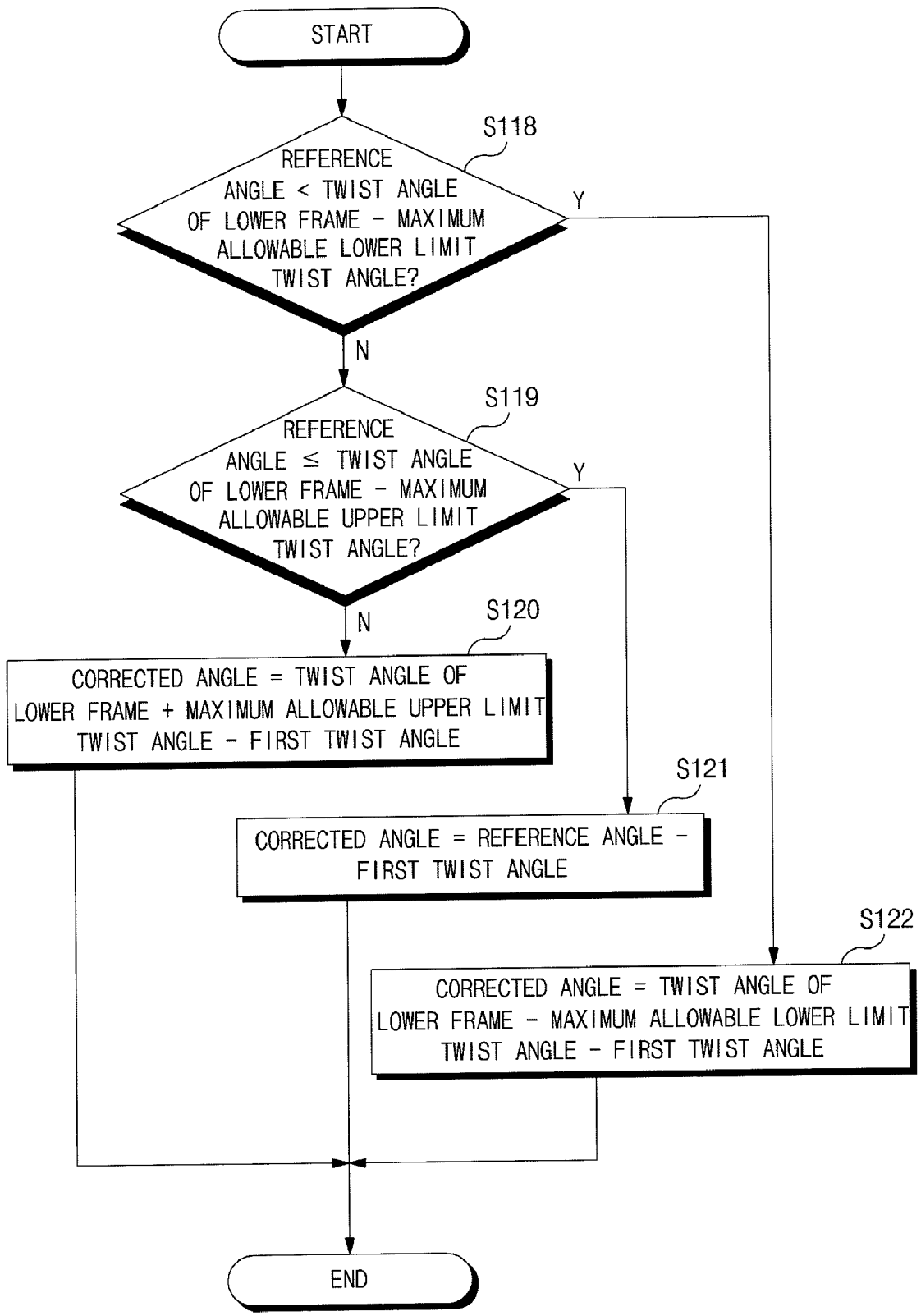
FIG. 16 is a flowchart illustrating a step of calculating corrected angles as illustrated in FIGS. 14 and 15.
Figure 17:
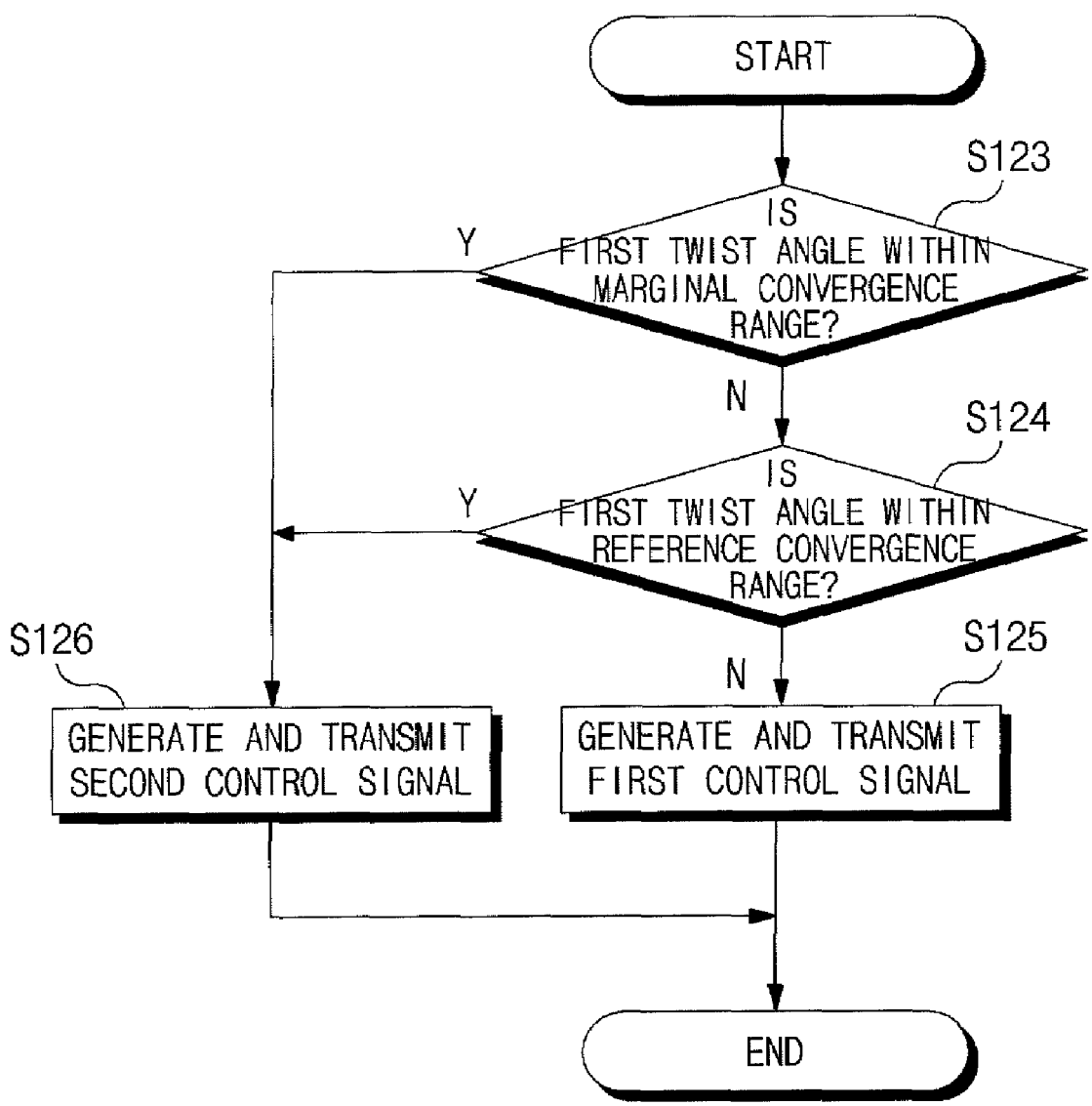
FIG. 17 is a flowchart illustrating a step of generating and transmitting a control signal as illustrated in FIGS. 14 and 15.

On the other hand, it is considered that the reference angle 203 exceeds the maximum allowable twist angle range 206. This refers to the case that the first twist angle 201 is level-controlled in the neighborhood of the maximum allowable upper limit twist angle range, or is controlled in the neighborhood of the maximum allowable lower limit twist angle range as illustrated in FIG. 11.

For this, a specified range in the neighborhood of the upper limit or lower limit of the maximum allowable twist angle range is determined by the following condition 6.

(Condition 6)

Twist Angle of Lower Frame+Maximum Allowable Lower Limit Twist Angle Range≦Marginal Convergence Range≦Twist Angle of Lower Frame+Maximum Allowable Lower Limit Twist Angle Range or Twist Angle of Lower Frame+Maximum Allowable Upper Limit Twist Angle Range−Constant Angle≦Marginal Convergence Range ≦Twist Angle of Lower Frame+Maximum Allowable Upper Limit Twist Angle Range Here, the constant angle 207 is an angle in a speed reduction region determined by user's optional setting.

More specifically, if the reference angle 203 is smaller than the "Twist angle of lower frame−Maximum allowable lower limit twist angle range", the upper frame 104 is tilt-controlled with a view to reaching "Twist angle of lower frame −Maximum allowable lower limit twist angle range". Accordingly, if the first twist angle 201 becomes smaller than the "Twist angle of lower frame−Maximum allowable lower limit twist angle range+Constant angle", the second control signal for operating the actuators 105d, 105e, 105e, and 105f at low speed is generated in order to prevent the damage of the cylinder due to the impact. Thereafter, the tilting is performed slowly to reach the maximum allowable lower limit twist angle.

By contrast, in the case where the reference angle is based on "Twist angle of lower frame−Maximum allowable upper limit twist angle range", and the first twist angle becomes larger than the "Twist angle of lower frame+Maximum allowable upper limit twist angle range−Constant angle", the second control signal is generated to protect the user. Thereafter, the tilting is performed slowly to reach the maximum allowable upper limit twist angle.

On the other hand, the output module 45 transmits the display signal to the display unit 30, and transmits the control signal (or the first control signal or the second control signal) to the main valve controller 52.

In addition, the control unit 40 may further include a time limit module 46 for limiting the time for performing the tilting control. The time limit module 46 is activated when the heavy equipment is in a standstill state (i.e. the traveling speed is "0", enables the upper frame to perform the leveling control in a predetermined reference operation time, and terminates the corresponding leveling control after the lapse of the reference operation time. Thereafter, the user can manually perform the leveling of the upper frame using the posture controller 13.

Even in a state where the heavy equipment is in a standstill state, the first twist angle is continuously changed and sensed due to vibration caused by the working or vibration of the heavy equipment itself, and thus the time limit module 46 is to compulsorily terminate the tilting control of the upper frame after the lapse of the predetermined time, so that the user can perform a precise work.

On the other hand, if the lower frame is in a traveling state (i.e. the traveling speed of the lower frame is not "0") the time limit module 46 is not activated, and an automatic leveling control of the heavy equipment is performed without limiting the operation time.

On the other hand, if an emergency, in which a normal tilting control is not performed, occurs due to an abnormal state of the sensor or the output of the driving unit during the tilting control, user's direct participation in the control process may be taken through the following construction.

The control unit 40 may further include an emergency stop module 47 for stopping the tilting control by judging whether an emergency stop condition is satisfied. The emergency stop condition is judged by activation/inactivation of the control lock lever, variation of the posture controller, on/off state of the auto level mode switch, or an operation state of the working device.

That is, while a user performs an auto leveling control by activating the auto level mode switch and observes the leveling control process through the display unit 30 and so on, he/she can input an activation of the control lock lever, variation of the posture controller, or turn-off of the auto level mode switch through the input means.

In this case, the emergency stop module 47 recognizes the activation of the control lock lever 12 inputted from the user, the input of a tilting command according to the variation of the posture controller, or the turn-off of the auto level mode switch, and immediately terminates the tilting control. Also, the emergency stop module immediately terminates the tilting control when it recognizes that the working device is in a working state through the working state information inputted from the working device. Accordingly, interference becomes possible during the user's leveling control process, and thus the safety of the equipment is increased.

Hereinafter, a method for controlling an automatic leveling for heavy equipment according to an embodiment of the present invention will be described in detail with reference to the accompanying drawings.

The method for controlling an automatic leveling for heavy equipment according to an embodiment of the present invention includes a sensing step s1, a control signal generation step s2, and a driver operation step s3.

More specifically, the method for controlling an automatic leveling for heavy equipment in which a lower frame 101 having a traveling means 102 and an upper frame 104 are combined together by a tilting means 105 that includes a sensor unit 10, a control unit 40, and a driving unit 50, which includes the steps of (A) the sensor unit 10 sensing twist angles (i.e. pitching angles and rolling angles) of the lower frame 101 and the upper frame 104 against a reference horizontal surface as an inclination sensor mounted on the lower frame 101 and the upper frame 104, and measuring a traveling speed of the heavy equipment 100 as a traveling sensor; (B) the control unit limiting an operation time to a predetermined reference operation time in a standstill state of the heavy equipment 100 or the traveling means 102 of the heavy equipment 100 while calculating a corrected angle to which the upper frame 104 is to be tilted based on the twist angle, without limiting the operation time, in a traveling state thereof, generating a control signal for controlling actuators 105*d*, 105*e*, 105*f*, and 105*g* for performing a leveling control of the upper frame 104 in accordance with the corrected angle, and transmitting the control signal to the driving unit 50; and (C) the driving unit performing a leveling control by operating the actuators 105*d*, 105*e*, 105*f*, and 105*g* on the basis of the control signal. Thereafter, within the reference operation time, a loop control is performed by sensing again the tilt angle and the traveling signal.

Hereinafter, the step (B) according to an embodiment of the present invention will be described in detail.

First, it is judged whether conditions precedent of control is satisfied, and if the conditions precedent of control is not satisfied, the leveling control is terminated (step s101).

In this case, the conditions precedent to control is determined based on the input state of the input unit. Specifically, whether the conditions precedent to control are satisfied is judged by independently judging whether the control lock lever 12 is in an active state, whether the posture controller 13 is in a center position, and whether the equipment is in a traveling state. If all the conditions, including an inactive state of the control lock lever 12, the posture controller 13 located in the center, on state of the auto level mode switch, and the traveling state of the heavy equipment 100, are satisfied, it is judged that the conditions precedent to control are satisfied, and the next step is performed. If any one of the above-described conditions is not satisfied, the corresponding auto leveling mode is terminated, and the auto level mode switch is turned off.

In this case, if the traveling speed sensed by the traveling sensor is not "0", the equipment is in a traveling state, while if the traveling speed is "0", the equipment is in a standstill state.

Step (b1) sets the sensed tilting angle of the upper frame 104 as the first twist angle (step s102) if the conditions precedent to control are satisfied. Then, the step (b) calculates the corrected angle by judging whether the basis of the corrected angle is the reference angle, the maximum allowable upper limit twist angle range, or the maximum allowable lower limit twist angle range (step S103).

The corrected angle is calculated through the next steps (b11) to (b13) using the twist angle of the lower frame, the reference angle, the maximum allowable lower limit angle range, the maximum allowable upper limit twist angle range, and the first twist angle as selective parameters.

Step (b11) judges whether the condition "Reference angle<Twist angle of lower frame−Maximum allowable lower limit twist angle range" is satisfied, and if the condition is satisfied, it computes the corrected angle as "Twist angle of lower frame−Maximum allowable lower limit twist angle range−First twist angle" (steps s118 and s122).

Step (b12) judges whether the condition "Reference angle≦Twist angle of lower frame+Maximum allowable upper limit twist angle range" is satisfied if the reference angle condition in step (b11) is not satisfied, and if the condition is satisfied, it computes the corrected angle as "Reference angle−First twist angle" (Steps s119 and s121).

Step (b13) computes the corrected angle as "Twist angle of lower frame+Maximum allowable upper limit twist angle range−First twist angle" if the reference angle condition in step (b12) is not satisfied (Step s120).

If the corrected angle calculated in step (b1) is "0", the current target of tilting control is satisfied. In this case, step (b2) returns to step (b1) and continuously checks whether the tilting control of the upper frame is required until the traveling is stopped or until the emergency stop condition is satisfied as described above (Step s104).

If the corrected angle is not "0", step (b2) calculates the second twist angle by the above-described condition 1, and compares the second twist angle with the maximum allowable twist angle range. If the second twist angle gets out of the maximum allowable twist angle range, the tilting control cannot be performed, and thus the corresponding tilting control is terminated (Steps s105 and s106).

Step (b3) generates a control signal for controlling the actuators 105d, 105e, 105f, and 105g for tilting in accordance with the corrected angle and the second twist angle if the second twist angle is within the maximum allowable twist angle range, and transmits the control signal to the driving unit (Step s107).

In this case, step (b3) generates the first and second control signal for operating the actuators 105d, 105e, 105f, and 105g at different speeds in order to protect the cylinder of the actuators 105d, 105e, 105f, and 105g or the user. For this, the generation of the control signal is subdivided into steps (b31) to (b33).

Step (b31) compares the first twist angle with the marginal convergence range, and if the first twist angle is out of the marginal convergence range, it compares the first twist angle with the reference convergence range (Steps s123 and s124).

If the first twist angle is out of the reference convergence range in step (b31), there is an extra space in the operation region of the cylinder of the actuator, and thus step (b32) generates the first control signal for operating the actuators at normal speed (Step s125).

If the first twist angle is within the marginal convergence range or within the reference convergence range in step (b31), step (b33) generates the second control signal for operating the actuators 105d, 105e, 105f, and 105g at low speed (Step s126). That is, as described above, if the second twist angle is within the marginal convergence range, the second control signal is generated to protect the cylinder in the operation limit region. Also, if the first twist angle is within the reference convergence range, the second control signal is generated to protect the user from an abrupt impact.

Step (b4) judges whether the equipment is in a traveling state after step (b3), and if the equipment is in a traveling state, it returns to the step (b1), and performs the tilting control of the upper frame until the traveling is stopped or until the emergency stop condition is satisfied (Step s108).

If the equipment is not in a traveling state, i.e. if the equipment is in a standstill state in step (b4), step (b5) starts counting of the operation time for limiting the tilting control time (Step s109).

Step (b6) performs the steps (b1) to (b3) after the step (b5) (Steps s110 and s115). However, if the corrected angle is "0°" in step (b2), the target of tilting control is satisfied, and thus the corresponding tilting control is terminated. In addition, after performing the step (b3), step (b6) judges whether the equipment is in a traveling state, and if the equipment is in a traveling state, it returns to the step (b1) in which the tilting control signal is not limited, and performs the tilting control of the upper frame until the traveling is stopped or until the emergency stop condition is satisfied (Step s116).

Step (b7) terminates the corresponding tilting control if the operation time becomes equal to or exceeds the reference operation time optionally set by the user in a state that the equipment is not in a traveling state (i.e. the equipment is in a standstill state) in step (b6), and returns to the step (b6) if the operation time is less than the reference operation time (Step s117). That is, if the corrected angle becomes "0°"within the reference operation time and the target of tilting control is achieved, or until the emergency stop condition is satisfied, the tilting control of the upper frame is performed.

In addition, if the emergency stop condition is satisfied through the user's manipulation of the input unit 10 and so on, the leveling control process is immediately terminated.

In this case, the emergency stop condition is satisfied in the case where the control lock lever 12 is activated according to the user's input, the posture controller 13 is varied, the auto level mode switch 11 is turned off, or the working devices including a boom and an arm are in an operation state.

If the emergency stop condition is satisfied, the emergency stop module transmits a stop command to the respective modules to terminate the corresponding leveling control process.

As described above, according to the system and method for controlling an automatic leveling for heavy equipment according to the embodiments of the present invention, the leveling work that is required at all times is automatically performed in operating the heavy equipment in an inclined site, and thus an operator's convenience is increased.

In addition, a user can directly stop the tilting control by inputting an emergency stop condition during the tilting control process, and thus the stability in use is increased.

In addition, in the case of using an attenuation ratio, the operation speed of the actuators can be adjusted at a marginal operation point in accordance with the specification of the actuators, and thus the driving device can be protected.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system for controlling automatic leveling of construction equipment with a lower frame, an upper frame, and tilting means, the lower frame having traveling means, the upper frame tiltably and swingably connected to the lower frame, and the tilting means being for tiltably connecting the upper frame to the lower frame, the system comprising:

a sensor unit, provided in the equipment, for sensing twist angles of the lower frame and the upper frame against a reference horizontal surface and a traveling speed of the equipment;

a control unit for receiving the twist angles and the traveling speed, setting a limit of an operation time for an automatic leveling in a standstill state of the equipment while calculating a corrected angle to which a twist angle of the upper frame is to be corrected, without setting the limit of the operation time for the automatic leveling, in a traveling state of the equipment, and generating a control signal for instructing an operation of the tilting means for controlling the corrected angle; and a driving unit for performing a tilting control through the tilting means for controlling the received control signal, wherein the control unit comprises:

a receiving module for receiving a signal from the sensor unit sensing the twist angles of the lower frame and the upper frame against a reference horizontal surface, and the traveling speed of the lower frame;

a corrected angle calculation module for setting the twist angle of the upper frame in comparison to a first twist angle, and calculating the corrected angle from the first twist angle;

a control signal generation module for judging whether to perform a leveling control by calculating the twist angle of the upper frame on the basis of an expanded surface of the lower frame as a second twist angle, and generating the control signal in accordance with a period in which the actuator is to be operated, based on the corrected angle; and an output module for transmitting the control signal to the driving unit.

2. The system of claim 1, wherein the control unit further comprises a display signal generation module for generating a display signal for displaying the twist angles of the lower frame and the upper frame through a display unit provided with an image display device.

3. The system of claim 1, wherein the control unit further comprises a time limit module for counting the operation time in a state that the traveling means is stopped, comparing the counted operation time with a predetermined reference operation time during leveling control, and if the counted operation time exceeds the predetermined reference operation time, terminating the performing of the corresponding leveling control.

4. The system of claim 1, wherein the control unit further comprises an emergency stop module for immediately terminating the leveling control if an emergency stop condition is satisfied during the performing of the leveling control.

5. The system of claim 1, wherein the corrected angle is determined by calculating "twist angle of lower frame−maximum allowable lower limit of the twist angle range−first twist angle" in the case where the reference angle is "reference angle<twist angle of lower frame−maximum allowable lower limit of the twist angle range";

by calculating "reference angle−first twist angle" in the case where the reference angle is "twist angle of lower frame−maximum allowable lower limit of the twist angle range ≦reference angle≦twist angle of lower frame+maximum allowable upper limit of the twist angle range"; and by calculating "twist angle of lower frame+maximum allowable upper limit of the twist angle range−first twist angle" in the case where the reference angle is "twist angle of lower frame+maximum allowable upper limit of the twist angle range−first twist angle".

6. The system of claim 1, wherein the control signal of the control signal generation module is generated in a manner that, if the first twist angle is within a marginal convergence range or within a reference convergence range, a second control signal for operating the actuator at low speed is generated; and if the first twist angle is out of the marginal convergence range and the reference convergence range, a first signal that does not limit the operation speed of the actuator is generated;

wherein the marginal convergence range is calculated through "twist angle of lower frame −maximum allowable lower limit of the twist angle range≦marginal convergence range≦twist angle of lower frame−maximum allowable lower limit twist angle range+constant angle" or "twist angle of lower frame+maximum allowable upper limit of the twist angle range−constant angle≦marginal convergence range≦twist angle of lower frame+maximum allowable upper limit of the twist angle range"; and the reference convergence range is calculated through "reference angle−constant angle≦reference convergence angle reference angle+ constant angle".

7. The method of claim 1, wherein the step (b3) of generating the control signal comprises the steps of:

(b31) comparing the first twist angle with the marginal convergence range, and if the first twist angle is out of the marginal convergence range, comparing the first twist angle with the reference convergence range;

(b32) if the first twist angle is out of the reference convergence range in step (b31), generating the first control signal that does not limit the operation speed of the actuator; and (b33) if the first twist angle is within the marginal convergence range in step (b31) or within the reference convergence range in step (b33), generating the second control signal for operating the actuators at low speed;

wherein the marginal convergence range is calculated through "twist angle of lower frame −maximum allowable lower limit of the twist angle range≦marginal convergence range≦twist angle of lower frame−maximum allowable lower limit of the twist angle range+constant angle" or "twist angle of lower frame+maximum allowable upper limit of the twist angle range−constant angle≦marginal convergence range≦twist angle of lower frame+maximum allowable upper limit of the twist angle range"; and the reference convergence range is calculated through "reference angle−constant angle≦reference convergence angle≦reference angle+ constant angle".

8. A method for controlling automatic leveling of construction equipment with a lower frame, an upper frame, and a tilting means including a sensor unit, a control unit, and a driving unit, the lower frame having traveling means, the upper frame tiltably and swingably connected to the lower frame, and the tilting means being for tiltably connecting the upper frame to the lower frame, the method comprising the steps of:

(A) sensing, by the sensor unit, twist angles of the lower frame and the upper frame against a reference horizontal surface as an inclination sensor mounted on the lower frame and the upper frame, and measuring a traveling speed of the heavy equipment as a traveling sensor;

(B) limiting, by the control unit, an operation time to a predetermined reference operation time in a standstill state of the heavy equipment or the traveling means of the heavy equipment while calculating a corrected angle to which the upper frame is to be tilted based on the twist angle, without limiting the operation time, in a traveling state thereof, generating a control signal for controlling actuators for performing a leveling control of the upper frame in accordance with the corrected angle, and transmitting the control signal to the driving unit; and (C) performing, by the driving unit, a leveling control by operating the actuators on the basis of the control signal; wherein the step (B) comprises the steps of:
 (b1) setting the sensed tilting angle of the upper frame as a first twist angle, and calculating a corrected angle for tilting the upper frame from the first twist angle;
 (b2) if the corrected angle is "0", returning to the step (b1), while if the corrected angle is not "0", calculating a second twist angle, and if the second twist angle is less than or exceeds the maximum allowable twist angle range, terminating the tilting control;
 (b3) if the second twist angle is within the maximum allowable twist angle range, generating a control signal for controlling the actuators for tilting in accordance with the corrected angle and the second twist angle;
 (b4) if the equipment is in a traveling state, returning to the step (b1);
 (b5) if the equipment is not in a traveling state in step (b4), starting counting of the operation time;
 (b6) performing the steps (b1) to (b3) after the step (b5), if the corrected angle is "0°" in step (b2), terminating the tilting control, judging whether the equipment is in a traveling state after step (b3), and if the equipment is in a traveling state, returning to the step (b1); and
 (b7) if the equipment is not in a traveling state in step (b6) and the operation time exceeds the predetermined reference operation time, terminating the tilting control, while if the operation time is less than the reference operational time, returning to the step (b6).

9. The method of claim 8, further comprising the step of judging conditions precedent to the leveling control before the step (b1), and if the conditions precedent to the leveling control is not satisfied, terminating the leveling control.

10. The method of claim 9, wherein the conditions precedent to the leveling control are satisfied in the case where the control lock lever is in an inactive state and a posture controller is positioned in the center.

11. The method of claim 8, wherein the step (b1) of calculating the corrected angle comprises the steps of:
 (b11) judging whether the condition "reference angle<twist angle of lower frame−maximum allowable lower limit of the twist angle range" is satisfied, and if the condition is satisfied, calculating the corrected angle as "twist angle of lower frame−maximum allowable lower limit of the twist angle range−first twist angle";
 (b12) judging whether the condition "reference angle≦twist angle of lower frame+maximum allowable upper limit of the twist angle range" is satisfied if the reference angle condition in step (b11) is not satisfied, and if the condition is satisfied, calculating the corrected angle as "reference angle−first twist angle"; and
 (b13) calculating the corrected angle as "twist angle of lower frame+maximum allowable upper limit of the twist angle range−first twist angle" if the reference angle condition in step (b12) is not satisfied.

12. The method of claim 8, wherein the step of performing the tiling control is terminated in the case where the emergency stop condition is satisfied.

13. The method of claim 12, wherein the emergency stop condition is judged by an activation/inactivation of a control lock lever, variation of a posture controller, an on/off state of an auto leveling switch, an operation state of the working device, or a traveling state of the traveling means.

\* \* \* \* \*